United States Patent
Li et al.

(10) Patent No.: US 12,403,450 B2
(45) Date of Patent: Sep. 2, 2025

(54) DENITRIFICATION AND DEPHOSPHORIZATION COMPOSITE FILLER, PREPARATION METHOD AND APPLICATION

(71) Applicants: Beijing University of Civil Engineering and Architecture, Beijing (CN); China Electronics Engineering Design Institute Co., Ltd., Beijing (CN)

(72) Inventors: Haiyan Li, Beijing (CN); Zhaoying Liu, Beijing (CN); Yingjie Shen, Beijing (CN); Haijun Zhang, Beijing (CN); Ziyang Zhang, Beijing (CN); Meipeng Jian, Beijing (CN); Chaohong Tan, Beijing (CN); Yuanping Fang, Beijing (CN)

(73) Assignees: Beijing University of Civil Engineering and Architecture, Beijing (CN); China Electronics Engineering Design Institute Co., Ltd., Beijing (CN)

( * ) Notice: Subject to any disclaimer, the term of this patent is extended or adjusted under 35 U.S.C. 154(b) by 0 days.

(21) Appl. No.: 19/025,208

(22) Filed: Jan. 16, 2025

(65) Prior Publication Data
US 2025/0186974 A1    Jun. 12, 2025

(30) Foreign Application Priority Data
Jun. 20, 2024   (CN) .................. 202410799265.6

(51) Int. Cl.
*B01J 20/20*    (2006.01)
*B01J 20/28*    (2006.01)
(Continued)

(52) U.S. Cl.
CPC .......... *B01J 20/2803* (2013.01); *B01J 20/20* (2013.01); *B01J 20/28004* (2013.01);
(Continued)

(58) Field of Classification Search
None
See application file for complete search history.

(56) References Cited

U.S. PATENT DOCUMENTS 4,915,884 A * 4/1990 Capdeville ........... B01J 20/2803
                                                        252/175
10,150,094 B2 * 12/2018 Saleh ..................... B01J 20/205
(Continued)

OTHER PUBLICATIONS

CNIPA, Notification to grant patent right for Chinese application CN202410799265.6, Sep. 23, 2024.

*Primary Examiner* — Chester T Barry
(74) *Attorney, Agent, or Firm* — Hemisphere Law, PLLC; Zhigang Ma (57) ABSTRACT

The present invention provides a denitrification and dephosphorization composite filler, a preparation method and application. The composite filler is prepared with a polysulfone polymer as a skeleton and a hybrid denitrification electron donor material by an immersion precipitation phase conversion method. The composite filler designed by the present invention has uniform ball formation and strong controllable performance, solves the problem of poor stability of denitrification and dephosphorization in a system due to the disadvantages of easy system blockage, high consumption speed, weak synergy, etc. in the traditional improved medium, and has broad application prospects in wastewater treatment.

7 Claims, 5 Drawing Sheets (51) Int. Cl.
*B01J 20/30* (2006.01)
*C02F 1/28* (2023.01)
*C02F 3/32* (2023.01)
*C02F 101/10* (2006.01)
*C02F 101/16* (2006.01)
*C02F 103/00* (2006.01)

(52) U.S. Cl.
CPC ... *B01J 20/28019* (2013.01); *B01J 20/28059* (2013.01); *B01J 20/3007* (2013.01); *B01J 20/3042* (2013.01); *B01J 20/3071* (2013.01); *C02F 1/283* (2013.01); *C02F 3/327* (2013.01); *C02F 2101/105* (2013.01); *C02F 2101/163* (2013.01); *C02F 2103/001* (2013.01)

(56) References Cited

U.S. PATENT DOCUMENTS

| | | | |
|---|---|---|---|
| 12,239,948 B2* | 3/2025 | Tran | B01J 13/203 |
| 2014/0151305 A1* | 6/2014 | Schrage | C02F 1/288 |
| | | | 427/222 |
| 2015/0231849 A1 | 8/2015 | Chapman et al. | |
| 2017/0129192 A1 | 5/2017 | Chapman et al. | |
| 2017/0182738 A1* | 6/2017 | Griess | B26F 1/02 |
| 2021/0024390 A1* | 1/2021 | Ke | C02F 3/34 |
| 2023/0219833 A1* | 7/2023 | Lohan | C02F 3/327 |
| | | | 210/602 |

* cited by examiner

DENITRIFICATION AND DEPHOSPHORIZATION COMPOSITE FILLER, PREPARATION METHOD AND APPLICATION

TECHNICAL FIELD

The present invention relates to the technical field of water treatment, and more particularly relates to a denitrification and dephosphorization composite filler, a preparation method and application.

BACKGROUND

The continuous development of urbanization leads to prominent pollution problems of rainwater runoff. The rainwater runoff includes a large amount of nitrate nitrogen ($NO_3^-$—N), phosphate-phosphorus ($PO_4^{3-}$—P), and other substances, which may pose a serious threat to the water ecosystem, human health and economy.

At present, the rainwater runoff pollution is mainly treated by a bioretention system. The bioretention system is flexible in design and can treat rainwater through physical, chemical and biological synergy. However, most improved media are difficult to ensure long-term, efficient and stable removal of the above substances. Meanwhile, the rainwater runoff lacks enough biodegradable organic matter to maintain heterotrophic denitrification. In addition, accurate control of carbon source addition quantity in a distributed treatment facility is challenging, and inadequate control may lead to the problems of leaching of organic matter, nitrogen and phosphorus, degradation of system performance, etc.

Therefore, how to develop a denitrification and dephosphorization composite filler or an improved medium filler with high efficiency, stability, adaptability and sustainability to simultaneously remove $NO_3^-$—N and $PO_4^{3-}$—P in sewage has important practical needs.

SUMMARY

The present invention provides a denitrification and dephosphorization composite filler, a preparation method and application in rainwater runoff treatment and other low carbon-nitrogen ratio wastewater treatment with respect to the problems that the denitrification and dephosphorization stability is poor, it is easy to cause blockage and loss, rainfall impact resistance of a slow-release carbon source composite filler is insufficient, and pores are difficult to control after the existing dispersed granular and powdery improved media are applied to the bioretention system. The present invention can control the porosity and the electron donor ratio of the composite filler pertinently according to the features of pollutants, construct a denitrification and dephosphorization composite filler with strong adaptability and good stability, realize efficient treatment of $NO_3^-$—N and $PO_4^{3-}$—P in the pollutants, and ensure the stability of long-term operation of the system.

To achieve the above purpose, the present invention adopts the following technical solution:

A denitrification and dephosphorization composite filler is provided. The denitrification and dephosphorization composite filler has a spheroidal structure, a particle size of 3-5 mm, a specific surface area of 2-4 m²/g, and bearing capacity of ≥500 g.

The denitrification and dephosphorization composite filler is prepared with a polysulfone polymer as a skeleton and a hybrid denitrification electron donor material by an immersion precipitation phase conversion method.

The adoption of the above technical solution at least includes the following technical effects:

The composite filler designed by the present invention is suitable to be used as an improved medium for the filler layer of the bioretention system in terms of shape, particle size, specific surface area and strength performance, and takes the polysulfone polymer as the skeleton and compounded with the hybrid denitrification electron donor material, which can not only improve the strength of the composite filler, but also promote denitrification and dephosphorization. It is beneficial for the bioretention system especially to adapt to complex and changeable rain conditions.

Preferably, the polysulfone polymer comprises any one of polysulfone, polyethersulfone and polyarylsulfone.

The hybrid denitrification electron donor material comprises at least one heterotrophic denitrification electron donor material and one autotrophic denitrification electron donor material.

Wherein an electron donor of heterotrophic denitrification comprises a natural carbon source or an artificial carbon source.

The natural carbon source can be wood chips, straw, plant debris, etc.

The artificial carbon source can be polycaprolactone (PCL), 3-hydroxybutyrate and 3-hydroxyvalerate copolymer (PHBV), etc.

An electron donor of autotrophic denitrification comprises one or a mixture of more of iron pyrite, pyrite and elemental sulfur.

Further, the electron donor of autotrophic denitrification comprises pyrite and/or ferro sulphur.

A mass ratio of the electron donor of heterotrophic denitrification to the electron donor of autotrophic denitrification is 1:3 to 3:1.

A mass ratio of the polysulfone polymer to the hybrid denitrification electron donor material is 1:2 to 4:1.

The adoption of the above technical solution at least includes the following technical effects: The composite filler comprises two electron donor materials of heterotrophic denitrification and autotrophic denitrification, which is conducive to promoting denitrification by hybrid denitrification. The hybrid denitrification has the advantages of high denitrification efficiency, low by-products, stable pH, fast starting, long operating cycle, etc. The added sulfur and iron compounds, such as pyrite and/or ferro sulphur, are conducive to dephosphorization through the precipitation action of dissolved bivalent iron.

A second purpose of the present invention is to provide a preparation method of the denitrification and dephosphorization composite filler, which specifically comprises the following steps:

S1: putting the polysulfone polymer in an organic solvent, and stirring for dissolving;

S2: adding the solution obtained from S1 into the hybrid denitrification electron donor material and stirring evenly;

S3: dripping the solution obtained from S2 into a non-solvent to form a ball at a dripping rate of 60 to 100 drops per minute, and standing for more than 2 days;

S4: washing the composite material prepared from S3, and then drying for use.

Preferably, the mass fraction of the polysulfone polymer in the solution obtained from step S2 is 5% to 20%.

Preferably, the organic solvent in step S1 is any one of N,N-dimethylformamide, N,N-dimethylacetamide or N-methylpyrrolidone.

The non-solvent comprises water or ethanol.

The beneficial effects of adopting the above technical solution at least include: The composite filler can realize the regulation and control of the pores of the filler by changing the mass fraction of the polysulfone polymer in the preparation process, and then can realize the regulation and control of the carbon release rate.

Preferably, the mass fraction of the hybrid denitrification electron donor material in the solution obtained from step S2 is 5% to 10%.

Preferably, a material with adsorption performance and/or a pore-forming agent are also added to the solution obtained from step S2.

The material with adsorption performance is selected from activated carbon and/or biological carbon.

The pore-forming agent is selected from polyethylene glycol.

The beneficial effects of adopting the above technical solution at least include: The function of the composite filler can be controlled by changing the mass fraction of the hybrid denitrification electron donor material, which is conducive to denitrification under rain conditions with different carbon-nitrogen ratios. The addition of the material with adsorption performance to the composite filler is conducive to further improving the adsorption capacity of the composite filler to other pollutants, and the addition of the pore-forming agent can further increase the surface pores of the composite filler and increase the carbon release rate.

A third purpose of the present invention is to provide an application of the composite filler in sewage treatment systems, chemical production, biological scientific research, constructed wetland, etc.

Further, an application of the composite filler in bioretention systems, biological filters, packed bed reactors, constructed wetland, etc. in urban sewage and/or rainwater treatment systems is provided.

The composite filler designed by the present invention comprises, but is not limited to, the above application.

A fourth purpose of the present invention is to provide a bioretention system, comprising the composite filler, and the composite filler is arranged in an inundation region of the bioretention system.

Wherein according to the rainwater runoff quality and the rainfall features of a target region, the ratio of the polysulfone polymer and the hybrid denitrification electron donor material in the composite filler is determined.

Preferably, when the carbon-nitrogen ratio of rainwater in the target region is ≤3, the mass ratio of the heterotrophic denitrification electron donor to the autotrophic denitrification electron donor is ≥1:1;

when the carbon-nitrogen ratio of rainwater is ≥3, the mass ratio of the heterotrophic denitrification electron donor to the autotrophic denitrification electron donor is <1:1;

and/or, a dry period before rain in the target region is ≥10 days, and then the mass fraction of the polysulfone polymer is selected as: 12%≤ the mass fraction of the polysulfone polymer ≤20%.

A total pore volume is controlled as: 0.01 mL/g<total pore volume ≤0.02 mL/g to reduce the carbon source release rate of the composite material.

The dry period before rain in the target region is <10 days, and then the mass fraction of the polysulfone polymer is selected as: 5%≤the mass fraction of the polysulfone polymer <12%.

The total pore volume is controlled as: 0.02 mL/g<total pore volume ≤0.03 mL/g to improve the carbon source release rate of the composite material.

The beneficial effects of adopting the above technical solution at least include: the composite filler can control the carbon release rate by regulating the pores, and then is applied to the target region with different dry periods before rain, so as to reduce the carbon release rate in the target region with a long dry period and increase the carbon release rate in the target region with a short dry period.

Preferably, the composite filler occupies a volume ratio of 20% to 100% in the inundation region;

The composite filler can be added alone or added with a traditional filler.

Further, the traditional filler is selected from one or a mixture of more of quartz sand, zeolite or ceramisite.

The adding mode is selected from mixed filling or layered filling.

Further, the bioretention system is started by natural biofilm formation or inoculation biofilm formation; simulated rainwater runoff is artificially prepared for continuous influent to promote microbial enrichment; and the actual rainwater runoff is received after 1 to 2 weeks of starting.

According to the technical solutions, the present invention at least includes the following technical effects:

(1) The present invention combines the powdery electron donor material, which is cheap and easy to obtain, excellent in denitrification performance and difficult to recover, with a polysulfone polymer skeleton by the immersion precipitation phase conversion method, which is not only simple and easy to operation, but also uniform in ball formation. Moreover, the prepared composite filler has the advantages of good slow-release performance, high strength, stable structure, easy pore control, strong electron donor synergism, etc.

(2) The composite filler designed by the present invention can be added in the inundation region of the bioretention system, and the suitable preparation parameters and adding modes of the composite filler can be selected according to the rainwater runoff quality characteristics and rainfall features of application scenarios, which is targeted and flexible. The constructed bioretention system has excellent denitrification and dephosphorization performance, and has broad application prospects in rainwater runoff treatment and other low carbon-nitrogen ratio wastewater treatment.

DESCRIPTION OF DRAWINGS

To more clearly describe the technical solutions in embodiments of the present invention or in the prior art, the drawings required to be used in the description of the embodiments or the prior art will be simply presented below. Apparently, the drawings in the following description are merely the embodiments of the present invention, and for those ordinary skilled in the art, other drawings can also be obtained according to the provided drawings without contributing creative labor.

Figure 5:
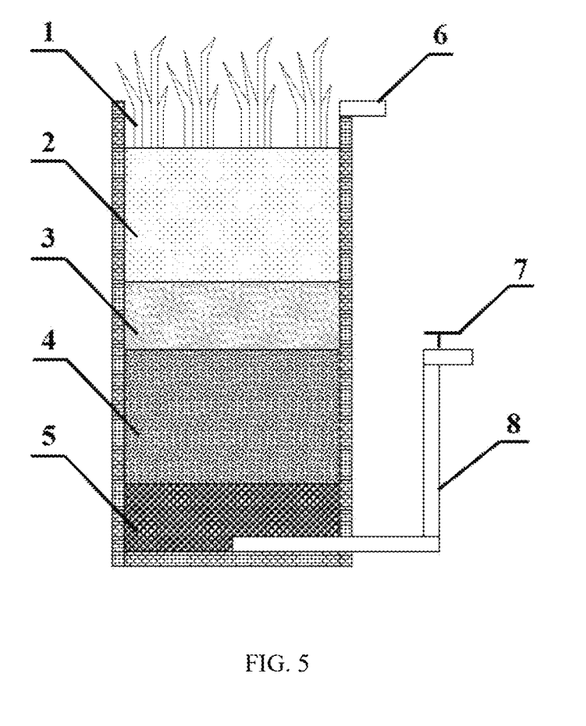
FIG. 5 is a schematic diagram of a structural device of a bioretention system in embodiments 6-7 and embodiment 9 of the present invention.

In the drawings:
1—growing plant; 2—planting soil layer; 3—filler layer; 4—composite filler mixing layer; 5—gravel drainage layer; 6—overflow pipe; 7—valve; 8—inundation region drainage pipe.

DETAILED DESCRIPTION

Embodiments of the present invention will be described below in detail. Examples of the embodiments are shown in drawings, wherein same or similar reference signs refer to same or similar elements or elements having same or similar functions from beginning to end. Embodiments described below by reference to the drawings are exemplary embodiments, and are used for explaining the present invention, and shall not be understood as a limitation to the present invention.

It should be understood in the description of the present invention that terms such as "upper", "lower", "front", "rear", "left", "right", "vertical", "horizontal", "top", "bottom", "inner", "outer", etc. indicate direction or position relationships shown based on the drawings, and are only intended to facilitate the description of the present invention and the simplification of the description rather than to indicate or imply that the indicated device or element must have a specific direction or constructed and operated in a specific direction, and therefore, shall not be understood as a limitation to the present invention.

In addition, the terms such as "first" and "second" are only used for the purpose of description, rather than being understood to indicate or imply relative importance or hint the number of indicated technical features. Thus, the features limited by "first" and "second" can explicitly or impliedly comprise one or more features. In the description of the present invention, the meaning of "a plurality of" is two or more unless otherwise clearly specified.

In the present invention, unless otherwise specifically regulated and defined, terms such as "installation", "connected", "connecting", "fixation" and the like shall be understood in broad sense, and for example, may refer to fixed connection or detachable connection or integral connection, may refer to mechanical connection or electrical connection, and may refer to direct connection or indirect connection through an intermediate medium or inner communication of two elements or interaction relationship of two elements. For those ordinary skilled in the art, the specific meanings of the above terms in the present invention may be understood according to concrete conditions.

In the present invention, unless otherwise clearly specified and defined, a first feature is "above" or "below" a second feature comprises that the first feature and the second feature come into contact or the first feature and the second feature come into contact through additional features thereof instead of direct contact. Moreover, the first feature is "on", "above" and "over" the second feature comprises that the first feature is directly above or slightly above the second feature, or just indicates that the horizontal height of the first feature is higher than that of the second feature. The first feature is "under", "below" and "beneath" the second feature comprises that the first feature is directly below or slightly below the second feature, or just indicates that the horizontal height of the first feature is lower than that of the second feature.

Embodiment 1

The present embodiment provides a preparation method of a denitrification and dephosphorization composite filler, comprising the following steps:
S1: putting polysulfone in an N,N-dimethylformamide organic solvent and stirring for dissolving;
S2: adding the polysulfone solution obtained from S1 to polycaprolactone (PCL) and pyrite, and stirring evenly, wherein a mass ratio of PCL and pyrite is 1:1, and the total mass fraction of PCL and pyrite in the solution is 5%;
wherein the mass fraction of polysulfone in the solution obtained from step S2 is 15%;
S3: dripping the solution obtained from step S2 into excess deionized water at room temperature to form a ball at a dripping rate of 60 drops per minute, and standing for 2 days, wherein the amount of the deionized water is unlimited as long as the obtained solution is dripped into the deionized water to form a ball.
S4: washing the obtained composite filler P1 with the deionized water and then drying for use.

Embodiment 2

The difference between embodiment 2 and embodiment 1 is only that the mass fraction of polysulfone in the solution obtained from step S2 is 20%, the mass of polysulfone and the organic solvent can be controlled, and the composite filler P2 can be obtained.

Reference Example 1

The difference between reference example 1 and embodiment 1 is only that the mass fraction of polysulfone in the solution obtained from step S2 is 25%, the mass of polysulfone and the organic solvent can be controlled, and the composite filler P3 can be obtained.

Figure 1:
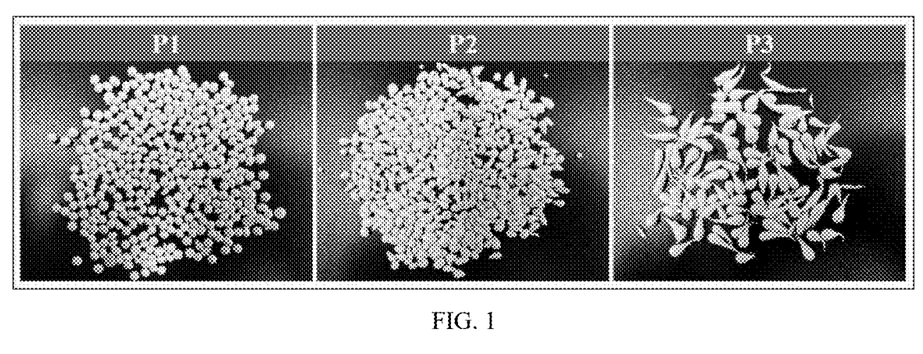
FIG. 1 shows physical pictures of composite fillers prepared by embodiments 1-2 and reference example 1 of the present invention.

The physical pictures of the composite fillers P1, P2 and P3 are shown in FIG. 1:

P1 and P2 have good balling property, and P2 is elliptic. The particle size detected by vernier calipers is between 3 and 5 mm. The compressive strength of the three composite materials is measured by an electronic universal testing machine. It is found that when the compression degree reaches 85%, the peak stresses of P1, P2 and P3 are 350.3 MPa, 420.7 MPa and 530.9 MPa respectively.

P3 has poor balling property and serious tailing phenomenon.

Figure 2:
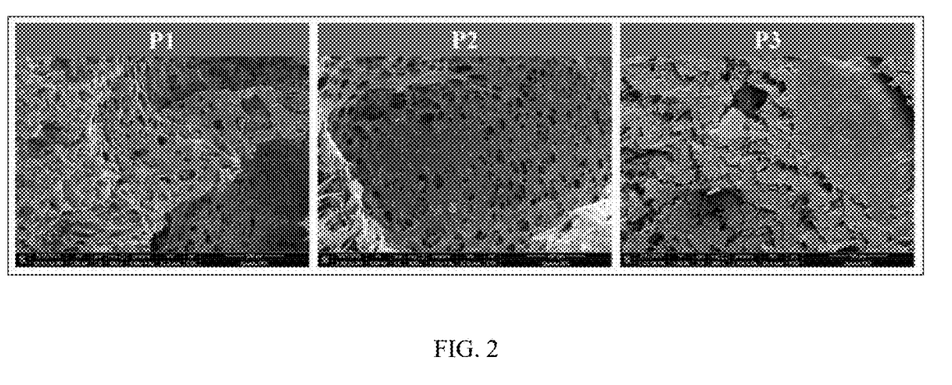
FIG. 2 shows internal SEM images of denitrification and dephosphorization composite fillers prepared by embodiments 1-2 and reference example 1 of the present invention.

FIG. 2 shows the internal SEM images of three composite fillers P1, P2 and P3 obtained by scanning electron microscopy (FEI Qtanta, 250FEG).

Wherein the pore structures of the composite fillers P1 and P2 are obvious. The load of the hybrid denitrification electron donor material is uniform, and the porosity is decreased with the increase of the concentration of polysulfone. The porosity of the composite filler P3 is poor, and the hybrid denitrification electron donor material is prone to aggregation.

Embodiment 3

The present embodiment provides a preparation method of a denitrification and dephosphorization composite filler, comprising the following steps:
S1: putting polysulfone in an N,N-dimethylformamide organic solvent and stirring for dissolving;
S2: adding the polysulfone solution obtained from S1 to 5 g of wood chips and 5 g of pyrite and stirring evenly, wherein the total mass fraction of the wood chips and the pyrite in the solution is 10%;
wherein the addition amount of polysulfone is 8 g, and the addition amount of the N,N-dimethylformamide organic solvent is 82 g;
the mass fraction of polysulfone in the solution obtained from step S2 is 8%;
S3: dripping the solution obtained from step S2 into excess deionized water at normal temperature to form a ball at a dripping rate of 60 drops per minute, and standing for 5 days.
S4: washing the obtained composite filler P4 with the deionized water and then drying for use.

Embodiment 4

The difference between embodiment 4 and embodiment 3 is only that: the addition amount of polysulfone added is 12 g, and the addition amount of the N,N-dimethylformamide organic solvent is 78 g;
The mass fraction of polysulfone in the solution obtained from step S2 is 12%, and the composite filler P5 is obtained.

Embodiment 5

Figure 3:
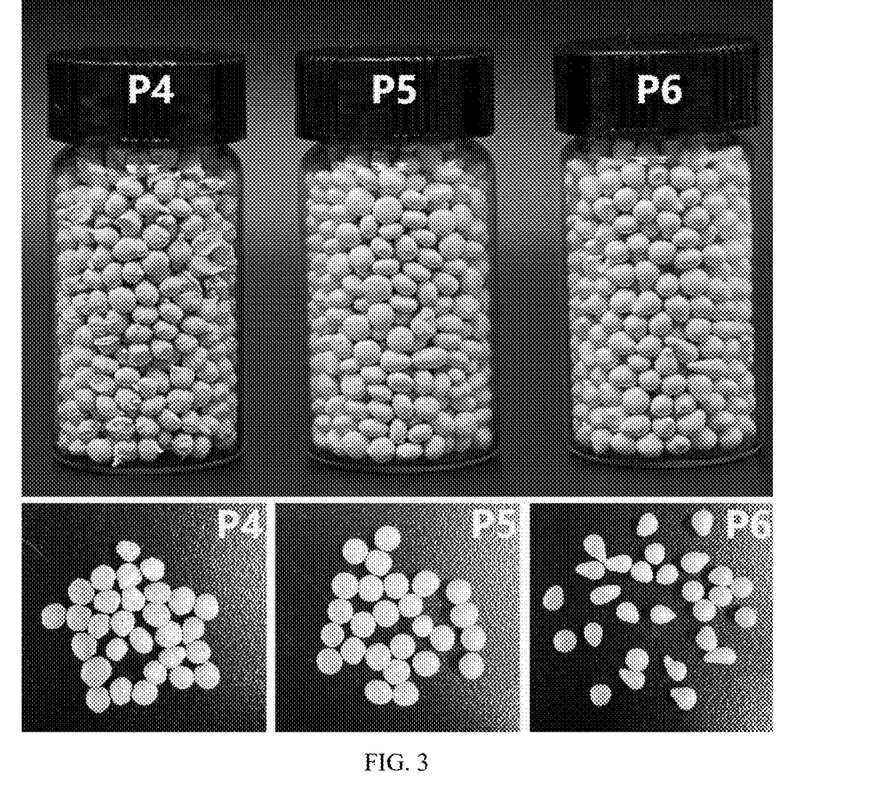
FIG. 3 shows physical pictures of composite fillers prepared by embodiments 3-5 of the present invention and physical pictures after 100 days of pure water soaking.

The difference between embodiment 5 and embodiment 3 is only that: the addition amount of polysulfone is 16 g, and the addition amount of the N,N-dimethylformamide organic solvent is 74 g;
The mass fraction of polysulfone in the solution obtained from step S2 is 16%, and the composite filler P6 is obtained.
The physical pictures of the composite fillers prepared in embodiments 3-5 are shown in FIG. 3:
The composite fillers P4, P5 and P6 have good balling property, and the particle size detected by vernier calipers is between 3 and 4 mm.
1 g of the three materials is weighed and put into three 150 mL conical flasks respectively. 100 mL of deionized water of the same batch is added. The conical flasks are sealed. The test temperature is controlled as 25° C. at 100 r/min. Samples are taken regularly to monitor DOC concentration. The water is changed after each sampling. The test lasts for 100 days. As shown in FIG. 3, the volume and the structure of the three materials do not change much after soaking for 100 days, which indicates that the structure of the composite filler is stable. The compressive strength of the three composite materials is measured by an electronic universal testing machine. It is found that when the compression degree reaches 85%, the peak stresses of P4, P5 and P6 are 27.2 MPa, 83.0 MPa and 374.2 MPa, respectively. From P4 to P6, the strength is increased successively and the porosity is decreased successively. The specific surface area of the three materials is measured by a specific surface area and aperture analyzer as 2.33-3.59 m²/g.

Figure 4:
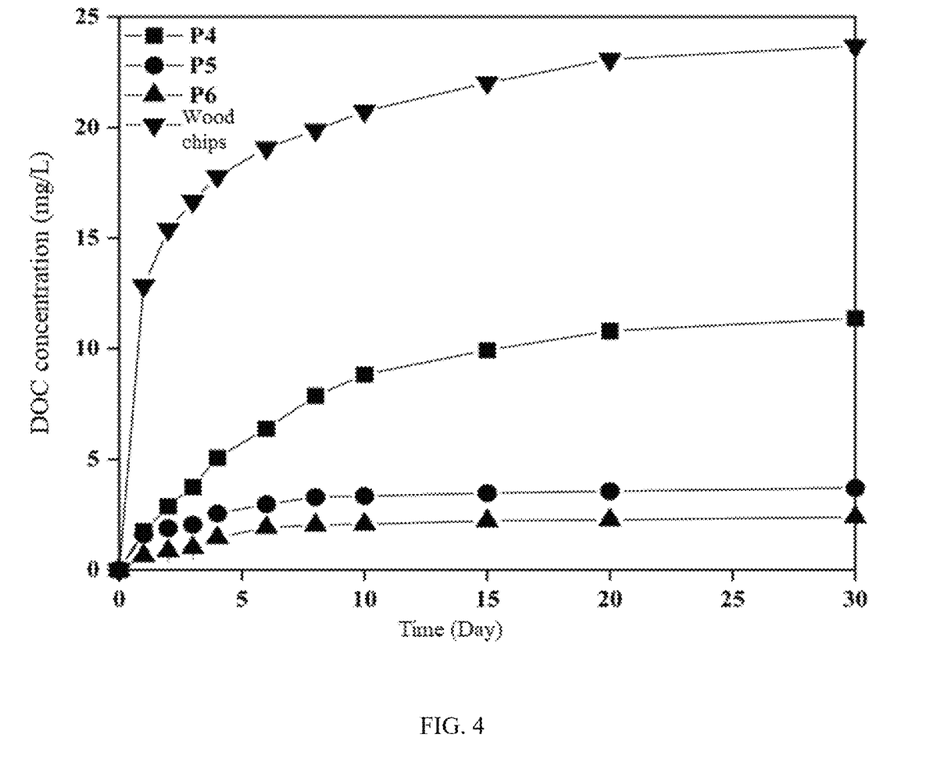
FIG. 4 is a diagram of carbon release performance of composite fillers prepared by embodiments 3-5 of the present invention.

FIG. 4 is a diagram of carbon release performance (measured by DOC concentration) of the composite fillers P4, P5 and P6 compared with wood chips. As shown in FIG. 4, compared with the original dispersed wood chips, the carbon source release rate and release amount of the three composite fillers are decreased significantly, which is sustainable. Meanwhile, the carbon source release rate is decreased with the increase of the concentration of polysulfone. The composite filler can control the carbon source release rate by regulating the pores.

Embodiment 6

The present embodiment provides a bioretention system. The structure of the system is shown in FIG. 5: specifically comprising a planting soil layer 2, a growing plant 1 arranged at the top of the planting soil layer, and a filler layer 3, a composite filler mixing layer 4 and a gravel drainage layer 5 which are located at the bottom of the planting soil layer successively;
an overflow pipe 6 located at the top side end of the planting soil layer;
an inundation region drainage pipe 8 located at the side end of the gravel drainage layer 5, and a valve 7 for controlling a switch of the inundation region drainage pipe.
The bioretention system in the present embodiment simulates two application scenarios:
a long dry period ≥10 days before rain in a rainy season, and a short dry period <10 days before rain in the rainy season, with a carbon-nitrogen ratio of rainwater being <3.
The prepared composite filler P4 is added to the composite filler mixing layer 4, and the composite filler layer 4 also comprises quartz sand.
The volume ratio of the composite filler P4 in the inundation region is 30%.
The bioretention system P4-BS is constructed to denitrification and dephosphorization from rainwater runoff, and started by inoculation biofilm formation.
In a formal operation stage, simulated rainwater runoff containing 10 mg/L $NO_3^-$—N and 2 mg/L $PO_4^{3-}$—P is introduced into the bioretention system. The bioretention system has a height of 70 cm and a diameter of 20 cm, and 5.5 L of water is injected each time. In the P4-BS system, the effluent concentrations of $NO_3^-$—N and $PO_4^{3-}$—P in the short dry period before rain are 0.30-1.23 mg/L and 0-0.05 mg/L respectively, and the removal rates are 87.71%-96.98% and 97.32%-100% respectively. $NO_3^-$—N and $PO_4^{3-}$—P are measured by ion chromatography (881 Basic IC Plus, Metrohm).
Description: The treatment time of the bioretention system depends on the dry period, and mainly depends on whether the effluent concentration of the next rainfall after the dry period is reduced.

Embodiment 7

The difference between embodiment 7 and embodiment 6 is only that:
The prepared composite filler P6 is added to the composite filler mixing layer 4, and the composite filler layer 4 also comprises quartz sand.
The volume ratio of the composite filler P6 in the inundation region is 25%.
In the P6-BS system, the effluent concentrations of $NO_3^-$—N and $PO_4^{3-}$—P in the long dry period before rain are 0.26-0.97 mg/L and 0-0.04 mg/L respectively, and the removal rates are 89.81%-97.41% and 98.21%-100% respectively. Synchronous deep denitrification and dephosphorization are realized. Moreover, the impact of heavy rainfall can be effectively dealt with, and good sustainability and broad application prospects are realized.

Embodiment 8

The present embodiment provides a preparation method of a denitrification and dephosphorization composite filler, comprising the following steps:
S1: putting polysulfone in an N,N-dimethylformamide organic solvent and stirring for dissolving;
S2: adding the polysulfone solution obtained from S1 to 3.33 g of wood chips and 6.67 g of pyrite and stirring evenly, wherein the total mass fraction of the wood chips and the pyrite in the solution is 10%;
wherein the addition amount of polysulfone is 16 g, and the addition amount of the N,N-dimethylformamide organic solvent is 74 g;
The mass fraction of polysulfone in the solution obtained from step S2 is 16%.
S3: dripping the solution obtained from step S2 into excess deionized water at normal temperature to form a ball at a dripping rate of 60 drops per minute, and standing for 5 days.
S4: washing the obtained composite filler P7 with the deionized water and then drying for use.

Embodiment 9

The difference between embodiment 9 and embodiment 6 is only that:
The prepared composite filler P7 is added to the composite filler mixing layer 4, and the composite filler layer 4 also comprises quartz sand.
The volume ratio of the composite filler P7 in the inundation region is 25%.
The mass ratio of the heterotrophic denitrification electron donor to the autotrophic denitrification electron donor in the composite filler P7 is about 1:2. In the application scenario, the dry period before rain is long, which is ≥10, and the carbon-nitrogen ratio of rainwater is >3.
In the P7-BS system, the effluent concentrations of $NO_3^-$—N and $PO_4^{3-}$—P in the long dry period before rain are 0.48-1.47 mg/L and 0-0.01 mg/L respectively, and the removal rates are 85.32%-95.23% and 99.51%-100% respectively.

In the illustration of this description, the illustration of reference terms "one embodiment", "some embodiments", "example", "specific example" or "some examples", etc. means that specific features, structures, materials or characteristics illustrated in combination with the embodiment or example are included in at least one embodiment or example of the present invention. In this description, exemplary statements for the above terms do not have to aim at the same embodiment or example. Moreover, the described specific features, structures, materials or characteristics can be combined appropriately in any one or more embodiments or examples. In addition, those skilled in the art can combine and integrate different embodiments or examples illustrated in this description.

Although the embodiments of the present invention have been shown and described above, it will be appreciated that the above embodiments are exemplary and shall not be understood as limitations to the present invention. Those ordinary skilled in the art can make changes, amendments, replacements and variations to the above embodiments within the scope of the present invention.

What is claimed is:

1. A denitrification and dephosphorization composite filler, wherein the denitrification and dephosphorization composite filler has a spheroidal structure, a particle size of 3-5 mm, a specific surface area of 2-4 m²/g, and load-bearing capacity of ≥500 g;
the denitrification and dephosphorization composite filler is prepared with a polysulfone polymer as a skeleton and a hybrid denitrification electron donor material by an immersion precipitation phase conversion method;
wherein the polysulfone polymer is selected from the group consisting of polysulfone, polyethersulfone and polyarylsulfone;
the hybrid denitrification electron donor material comprises at least one heterotrophic denitrification electron donor material selected from the group consisting of natural carbon source and artificial carbon source, and one autotrophic denitrification electron donor material selected from the group consisting of pyrite, ferro sulphur and combinations thereof;
wherein the denitrification and dephosphorization composite filler is made by a preparation comprising steps of:
S1: putting the polysulfone polymer in an organic solvent, and stirring for dissolving;
S2: adding the solution obtained from S1 into the hybrid denitrification electron donor material and stirring evenly;
S3: dripping the solution obtained from S2 into a non-solvent to form a ball at a dripping rate of 60 to 100 drops per minute, and standing for more than 2 days; and
S4: washing the composite material prepared from S3, and then drying for use;
moreover, the mass fraction of the polysulfone polymer in the solution obtained from step S2 is 5% to 20%.

2. The denitrification and dephosphorization composite filler according to claim 1, wherein a mass ratio of the electron donor of heterotrophic denitrification to the electron donor of autotrophic denitrification is 1:3 to 3:1;
a mass ratio of the polysulfone polymer to the hybrid denitrification electron donor material is 1:2 to 4:1.

3. The denitrification and dephosphorization composite filler according to claim 1, wherein the organic solvent in step S1 is any one of N,N-dimethylformamide, N,N-dimethylacetamide and N-methylpyrrolidone; and
the non-solvent comprises water or ethanol.

4. The denitrification and dephosphorization composite filler according to claim 1, wherein the mass fraction of the hybrid denitrification electron donor material in the solution obtained from step S2 is 5% to 10%.

5. The denitrification and dephosphorization composite filler according to claim 1, wherein a material with adsorption performance and/or a pore-forming agent are also added to the solution obtained from step S2;
the material with adsorption performance is activated carbon; and
the pore-forming agent is polyethylene glycol.

6. A method of using the denitrification and dephosphorization composite filler according to claim 1 in sewage treatment systems, chemical production, biological scientific research and constructed wetland.

7. A bioretention system, comprising the denitrification and dephosphorization composite filler according to claim 1, wherein the composite filler is arranged in an inundation region of the bioretention system.

* * * * *